United States Patent
Young et al.

(10) Patent No.: US 9,383,017 B2
(45) Date of Patent: Jul. 5, 2016

(54) TAPERED CHANNEL MACRO/MICRO FEATURE FOR MECHANICAL FACE SEALS

(75) Inventors: Lionel A. Young, Murrieta, CA (US); Joshua K. Benedict, Winchester, CA (US); John Davis, Temecula, CA (US)

(73) Assignee: Flowserve Management Company, Irving, TX (US)

(*) Notice: Subject to any disclaimer, the term of this patent is extended or adjusted under 35 U.S.C. 154(b) by 413 days.

(21) Appl. No.: 13/420,156

(22) Filed: Mar. 14, 2012

(65) Prior Publication Data
US 2012/0280456 A1 Nov. 8, 2012

Related U.S. Application Data

(60) Provisional application No. 61/465,169, filed on Mar. 15, 2011.

(51) Int. Cl.
*F16J 15/34* (2006.01)
(52) U.S. Cl.
CPC .......... *F16J 15/3412* (2013.01); *F16J 15/3408* (2013.01); *F16J 15/34* (2013.01)
(58) Field of Classification Search
CPC ..... F16J 15/3412; F16J 15/3424; F16J 15/34; F16J 15/3408
USPC .......................................... 277/399, 400, 403
See application file for complete search history.

(56) References Cited

U.S. PATENT DOCUMENTS

| | | | | |
|---|---|---|---|---|
| 2,402,033 A | * | 6/1946 | Flinn | 277/424 |
| 3,147,013 A | * | 9/1964 | Tracy | 277/400 |
| 3,383,116 A | * | 5/1968 | Carter | 277/385 |
| 4,082,296 A | * | 4/1978 | Stein | 277/400 |
| 5,174,584 A | * | 12/1992 | Lahrman | 277/400 |
| 5,447,316 A | * | 9/1995 | Matsui | 277/400 |
| 6,002,100 A | | 12/1999 | Etsion | |
| 6,105,968 A | * | 8/2000 | Yeh et al. | 277/399 |
| 6,213,473 B1 | * | 4/2001 | Lebeck | 277/399 |
| 6,341,782 B1 | * | 1/2002 | Etsion | 277/399 |
| 6,446,976 B1 | | 9/2002 | Key et al. | |

(Continued)

FOREIGN PATENT DOCUMENTS

GB    2 263 952 A    8/1993

OTHER PUBLICATIONS

The International Search Report for PCT/US2012/029062, date completed May 21, 2012, date mailed Jun. 5, 2012.

*Primary Examiner* — Kristina Fulton
*Assistant Examiner* — Nicholas L Foster
(74) *Attorney, Agent, or Firm* — Miller Canfield Paddock and Stone; Mark L Maki

(57) ABSTRACT

A mechanical face seal includes a pair of relatively rotatable seal rings having opposing seal faces which define a sealing region therebetween. The sealing region extends radially between the inside and outside diameters of the seal rings to seal a fluid in a sealing chamber near one diameter thereof. The seal faces are provided with tapered channel macro/micro features which generate hydrodynamic lift during relative rotation of the seal rings. The tapered channel macro/micro feature shows significant improvement in seal performance when compared to an untextured face. Low contact and hence low wear are attributed to a more distributed hydrodynamic load support function. Likewise, low leakage is believed to be the result of optimized cavitation function, and no debris was discovered in the micro-features at the conclusion of any testing.

20 Claims, 11 Drawing Sheets

(56) References Cited

U.S. PATENT DOCUMENTS 7,241,049 B2 * 7/2007 Lin et al. ............... 384/95
7,284,758 B1 * 10/2007 Hart et al. ............. 277/321
2002/0041070 A1 * 4/2002 Tran et al. ............. 277/400

* cited by examiner

Three dimensional tapered channel

Comparison of FEA and actual test results of temperature and torque vs. depth

Post test image of tapered channel seal face.

Friction testing (left), ethane test (right) temperature and friction plots for tapered channel and untextured mechanical seal designs.

Friction post-test radial trace of untextured carbon face (left) and tapered channel carbon face (right)

TAPERED CHANNEL MACRO/MICRO FEATURE FOR MECHANICAL FACE SEALS

CROSS REFERENCE TO RELATED APPLICATIONS

This application claims priority of U.S. Provisional Patent Application Ser. No. 61/465,169, the disclosure of which is incorporated herein by reference in its entirety.

FIELD OF THE INVENTION

The invention relates to a mechanical seal arrangement which includes a new macro/micro feature, preferably a tapered channel, which demonstrates significant cavitation affects as well as hydrodynamic load support.

BACKGROUND OF THE INVENTION

Mechanical face seals are used on various types of machines and equipment, such as pumps, compressors and gear boxes, which have rotating shafts and a sealing chamber adjacent the shaft wherein a fluid in the sealing chamber is prevented from leaking therefrom. Such mechanical seals include a pair of adjacent seal rings having opposing seal faces which define a sealing region therebetween. One of these seal rings typically is mounted on the shaft so as to rotate therewith while the other seal ring is non-rotatably mounted on a seal housing. The fluid being sealed is disposed on one edge of the sealing region, wherein the opposing seal faces at least reduce leakage of the sealed fluid across the sealing region.

Most liquid seals operate with the seal faces rotating in contact. However, due to asperities in the seal faces, some leakage may occur. In gas seals, the seal faces often are provided with grooves or recesses to generate hydrodynamic lifting forces. In this regard, the sealing faces typically separate a small distance wherein a thin film of fluid forms between the seal faces to lubricate the seal faces and reduce wear therebetween. Additionally, the grooves or recesses may pump the fluid film toward the fluid being sealed to reduce leakage of the sealed fluid.

With respect to the specific constructions of mechanical seals, one representative mechanical seal is disclosed in U.S. Pat. No. 6,446,976 (Key et al), the disclosure of which is incorporated herein in its entirety by reference. In this mechanical seal, one of the seal faces includes a plurality of concentric shallow annular grooves which preferably are disposed near the seal ring diameter that is farthest away from the fluid being sealed. In general, the basic construction of mechanical seals and the use of relatively rotatable seal rings are well known, and a detailed discussion of such mechanical seals is not required herein.

Also, a wide variety of seal face patterns are well known to the skilled artisan. For one such design, U.S. Pat. No. 5,834,094 (Etsion et al.) discloses the use of micropores in a seal face. U.S. Pat. Nos. 5,952,080, 6,002,100 and 6,046,430, also to Etsion, are all related to this patent, while U.S. Pat. No. 6,341,782 (Etsion) was subsequently directed to these micropore features. The disclosures of these references are incorporated herein in their entirety by reference. As to the specific micropores disclosed therein, such micropores are circular in plan view when viewing the seal face so as to either define concave or conical dimples or pockets. However, disadvantages have been associated with these micropores as discussed hereinafter.

In view of the foregoing, it is an object of the invention to overcome disadvantages associated with prior art mechanical seals such as the afore-mentioned micropores.

The invention relates to a tapered channel macro/micro feature for mechanical face seals, as well as a mechanical seal or seal ring incorporating such feature. The mechanical seal generally has a pair of coaxially aligned seal rings which are relatively rotatable during rotation of a rotating shaft. The seal rings have opposing seal faces that define a sealing region therebetween which prevents leakage of a fluid along the shaft.

At least one of the seal faces includes a plurality of a tapered channel macro/micro features which are distributed over the seal face, preferably in a plurality of circumferentially extending, annular rows. The rows of the tapered channels have concentrically increasing diameters. Preferably, the tapered channels of each row are radially staggered from one annular row to the next to provide a greater distribution of the tapered channels over the seal face.

The tapered channels serve as hydrodynamic lift features that generate a hydrodynamic lift which provides a stable separation of the seal faces that permits formation of a fluid film between the seal faces. Rather than the fluid film being generated solely by the static pressure of the fluid being sealed, the hydrodynamic lift features generate lift dynamically during shaft rotation to provide a lift load which is stable.

Testing of these unique macro/micro feature shows that it is possible to achieve a reduction in friction of 65%, significantly lower face temperature, exhibit debris resistance, show low to zero measureable leakage, and low to zero wear when compared to an untextured seal face. The term macro/micro feature is used to describe a feature that has a depth to size ratio, h/L (described hereinafter relative to FIG. 2), which is an order of magnitude smaller than current dimple configurations such as those disclosed in the Etsion patents referenced above, which is well below what may be considered useful from a performance standpoint based upon such prior art. This new macro/micro feature, preferably a tapered channel, demonstrates significant cavitation affects as well as hydrodynamic load support. These features are believed to be responsible for or contribute to this features' low leakage as well as its low friction/wear characteristics.

Other objects and purposes of the invention, and variations thereof, will be apparent upon reading the following specification and inspecting the accompanying drawings.

Figure 1A:
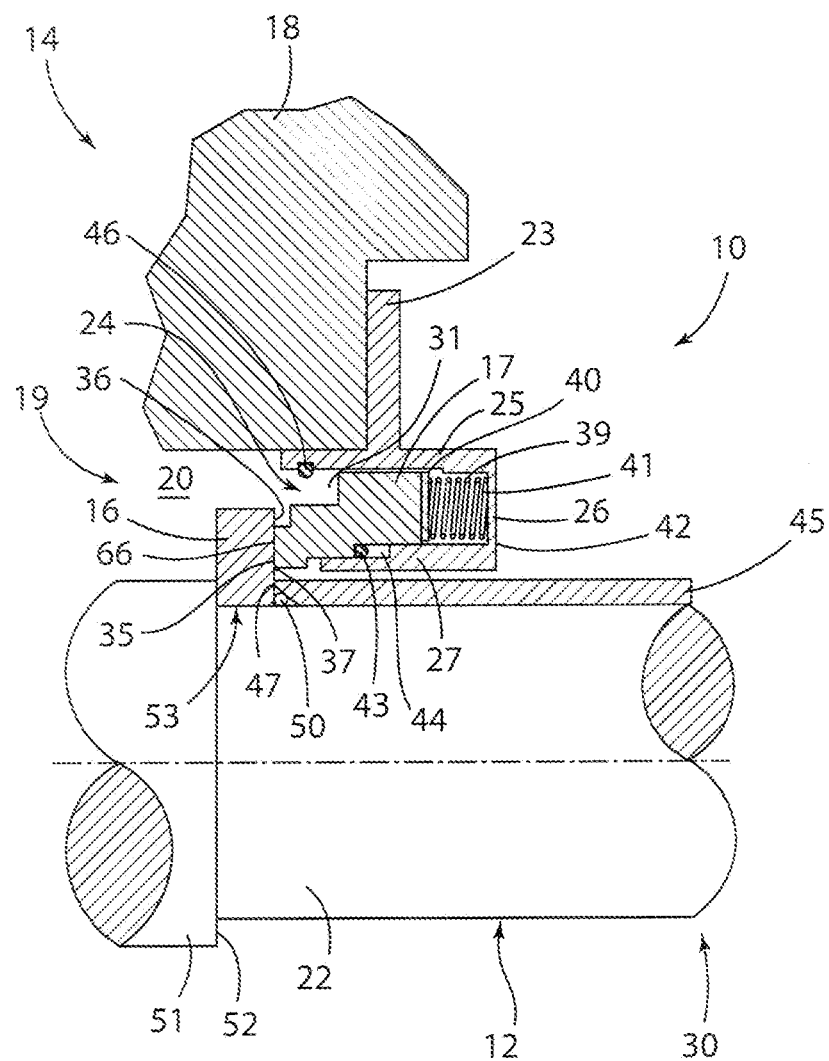
FIG. 1A is a cross-sectional view of a representative mechanical seal assembly.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1A, a mechanical face seal 10 is illustrated mounted on the rotatable shaft 12 of a machine 14. The mechanical seal 10 includes a pair of concentric seal rings 16 and 17 which operate as a rotor and a stator respectively and effectively prevent fluid leakage along the shaft 12. As will be described hereinafter, either of the seal rings 16 and 17 and most preferably, the seal ring, such as a silicon carbide ring, mating with a carbon ring is provided with a pattern of the tapered channel micro/macro features of the invention.

FIG. 1 is a representative view of one configuration for an exemplary mechanical face seal 10. The skilled artisan will appreciate that the tapered channels of the invention can be used in other types of machines 14 or mechanical seals 10 as needs require. The machine 14 as illustrated in FIG. 1A includes a housing 18 which defines a seal chamber 19 therein in which seal chamber 19 a fluid or process fluid 20 being sealed is confined. The machine 14 further includes a rotating shaft 12 to which the mechanical seal 10 is mounted. The shaft 12 drives components such as gears in a gearbox, a pump or a compressor impeller. The shaft 12 has a conventional circular cross section defined by an outer circumferential shaft surface 22. To prevent leakage of the fluid 20 from the seal chamber 19 along the shaft surface 22, the mechanical face seal 10 is mounted on the machine housing 18 and the shaft 12 and defines a seal radially therebetween to contain the fluid 20.

The mechanical seal 10 includes an annular seal housing or cartridge 23 which mounts to the exterior face of the machine 18 and has an interior cavity 24 which opens axially through the center area of the seal housing 23. The interior seal cavity 24 opens sidewardly so as to be in fluid communication with the seal chamber 19 and thereby define an extension of the seal chamber 19.

The seal housing 23 further includes an outer wall 25, an end wall 26 which extends radially inwardly toward the shaft 12, and an inner wall 27 which is disposed proximate to but spaced radially from the outer shaft surface 22. The shaft 12 extends axially out of the seal chamber 19 and through the interior cavity 24 of the mechanical seal 10 whereby an exposed end section 30 of the shaft 12 projects outwardly past the end wall 26 for connection to a motor or other drive unit of the machine 14.

The outer and inner walls 25 and 27 which define an annular seal ring pocket 31 that opens axially toward the seal chamber 19. The seal ring pocket 31 is adapted to slidably receive the seal ring 17 therein, wherein the seal ring 17 is essentially concentric to the shaft 12.

The seal ring 17 serves as a primary ring of the mechanical seal 10, and includes a seal face 35 which extends radially between the outside and inside seal ring diameters 36 and 37. Thus, the outside diameter 36 is exposed to the liquid 20 being sealed within the chamber 24 while the inside diameter 37 is exposed to an exterior fluid. One advantage of the seal ring of the invention is that a zero-leakage or low-leakage seal is achieved without the use of support systems such as a system which provides a barrier gas. Accordingly, the exterior fluid for the illustrated seal typically is exterior air which defines ambient air pressure. During normal operating conditions, the fluid 20 is at a higher pressure than the ambient air pressure, and may be a barrier gas in other seal configurations.

The seal ring 17 is prevented from rotating relative to the seal housing 23 by drive pins which engage the outermost circumferential surface of seal ring 17, and is biased axially toward the other seal ring 16 by a plurality of circumferentially spaced apart springs 39 which project axially from the seal housing end wall 26 into the pocket 31. In particular, the outer end of each spring 39 abuts axially against an annular backing plate 40 on the back face of the seal ring 17 as illustrated in FIG. 1A. The opposite inner end 41 of each spring 39 is seated in a corresponding bore 42 formed in the end wall 26. Alternate biasing members may be used besides springs.

To prevent migration of the fluid 20 along the circumferential and back faces of the seal ring 17, an O-ring 43 is provided in an annular groove 44 in the inner wall 27 to define a secondary seal. The O-ring 43 also acts to center the seal ring 17 relative to the shaft 12.

For assembly, a rigid retaining ring 46 is provided on the seal housing 23 to limit forward movement of the seal ring 17. The ring 46 confines the seal ring 17 within the housing 23.

To support the mating seal ring 16 in sealing engagement with the primary seal ring 17, a shaft sleeve 45 is non-rotatably connected to the shaft 12 so as to rotate in unison with the shaft 12. In particular, the shaft sleeve 45 has a generally tubular cross-section and has an annular end face 47 which projects radially outwardly from the shaft surface 22.

During assembly, the sleeve 45 is slidably received on the periphery of the shaft 12 and is secured in place by additional equipment components disposed adjacent thereto. The fluid 20 is prevented from leaking between the shaft sleeve 45 and the shaft 12 by an O-ring 50 which defines a secondary seal between the inner face of the shaft sleeve 45 and the outer shaft surface 22.

When secured in place, the sleeve end face 47 is spaced axially from a circumferential shoulder 51 formed on the shaft 12. The shoulder 51 has a face 52 which faces axially toward the sleeve face 47 in spaced relation to define a seal ring pocket 53 therebetween.

As to the seal ring 16, the seal ring 16 defines a mating ring which sealingly mates with the primary ring 17. During assembly, the seal ring 16 is slid axially onto the shaft 12 and abuts against the shoulder 51. The shaft sleeve 45 is then slid onto the shaft 12 wherein the seal ring 16 is confined between the faces 52 and 47.

The seal ring 16 further includes a seal face 66 which faces axially toward the opposing seal face 35 of the primary ring 17. The seal face 66 extends radially between an outside diameter 66A thereof and an inside diameter 66B. As seen in FIG. 1A, the seal face 66 abuts against the O-ring 50 near the inside diameter 66B to prevent leakage of the fluid 20 between the seal ring 16 and the shaft 12.

With the above-described arrangement, the seal ring 17 is non-rotatably supported in the seal housing 23 while the opposing seal ring 16 is rotatably supported on the shaft 12 so as to rotate in unison therewith. When the shaft 12 is not rotating, the opposing seal faces 35 and 66 are disposed in contacting relation due to the biasing force of the springs 39 to prevent migration of the liquid being sealed radially inwardly across the sealing region which extends radially across these seal faces 35 and 66.

During shaft rotation, the resilient spring loading of the seal ring 17 permits the seal ring 17 to be displaced axially away from the seal face 66 further into the pocket 31. Therefore, during this shaft rotation, the seal faces 35 and 66 separate slightly whereby a liquid film is defined therebetween as will be described in further detail hereinafter. Even though seal face separation is permitted, the springs 39 continue to generate an axial closing force on the seal ring 16.

Figure 3A:
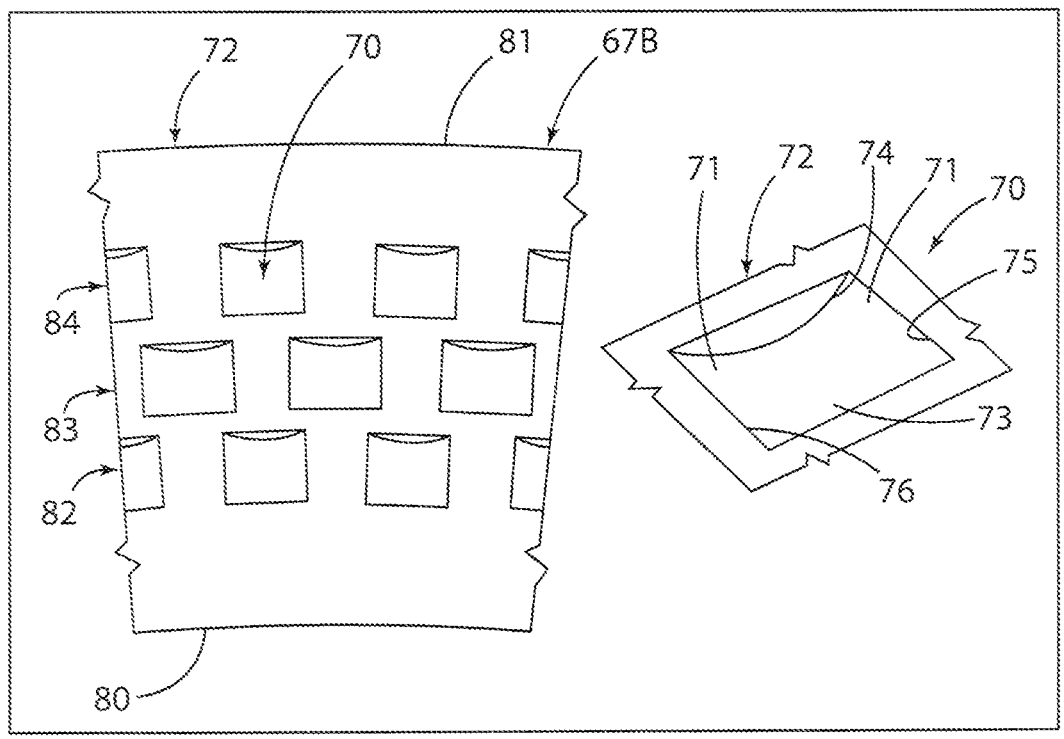
FIG. 3A is a perspective view of a seal face with a plurality of said tapered channels, and an enlarged radially-directed perspective view of one of said tapered channels.
Figure 3B:
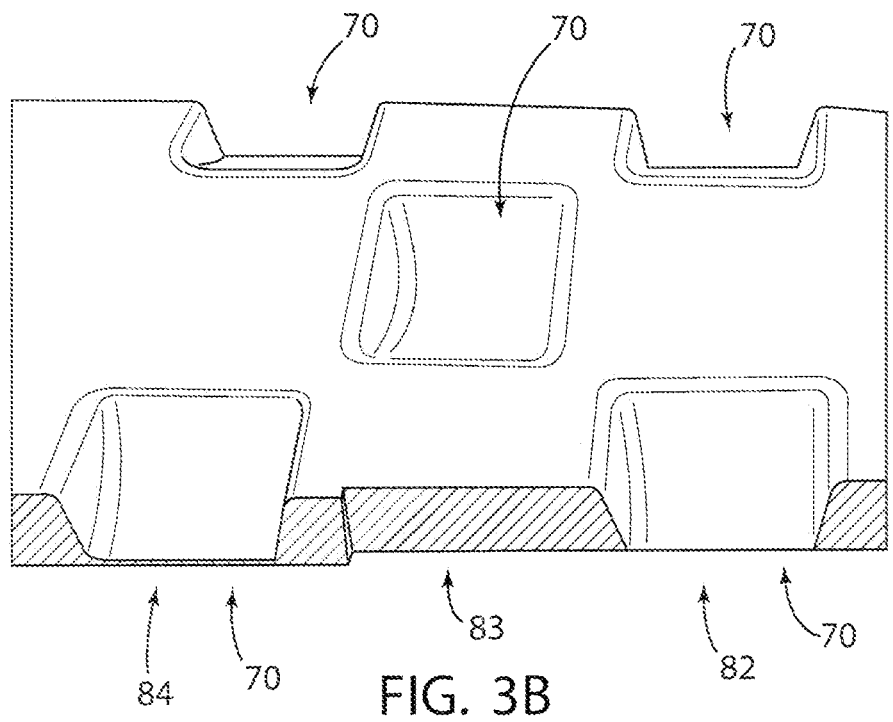
FIG. 3B is a perspective view of the seal face with a plurality of said tapered channels taken from a first direction.
Figure 3C:
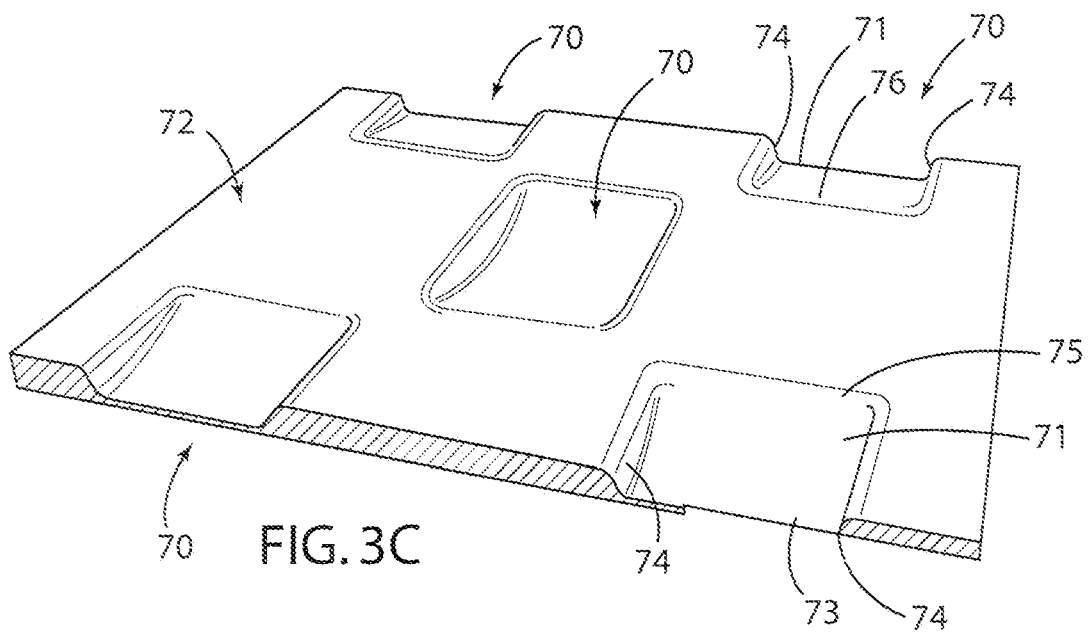
FIG. 3C is a perspective view of the seal face with a plurality of said tapered channels taken from a second direction.

In order to eliminate leakage of the fluid 20 across the seal faces 35 and 66 even when the fluid film is generated therebetween, the mechanical seal 10 is manufactured with a face pattern as illustrated in FIGS. 3A-3C. In particular, FIGS. 3A-3C illustrate the tapered channel micro/macro features 70 which can be applied to the seal face 35 of the primary seal ring 17. However, it also will be understood that this same seal face pattern may be applied to the seal face 66 of the rotating seal ring 16 if such seal face 66 were made of a suitable, durable material instead of the carbon material. Essentially, the features 70 can be used on either a rotating seal ring or a stationary seal ring. With respect to FIGS. 3-11, alternate seal rings 67A and 67B (FIG. 4) were used for test purposes as described hereinafter and thus, the description of the features 70 in these drawings will refer to the carbon seal ring 67A and the silicon carbide seal ring 67B shown in FIG. 4, wherein the features 70 are formed in the seal face 72 of seal ring 67B. It will be understood that such seal rings 67A and 67B would be supported for relative rotation in a conventional manner, such as that described above relative to FIG. 1A.

Figure 1B:
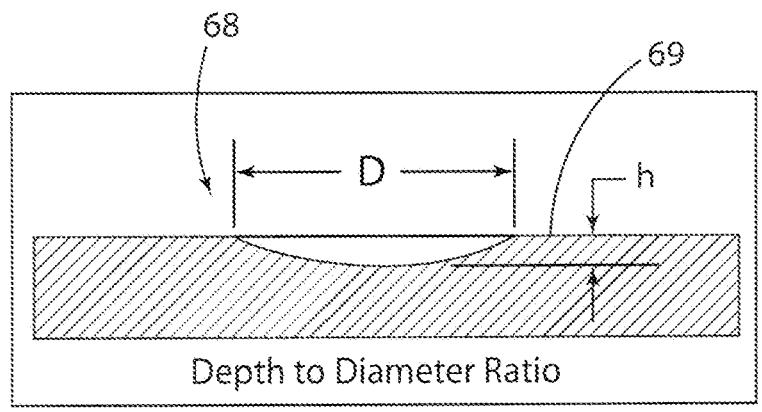
FIG. 1B is a cross-sectional view of a prior art micropore.

Disclosure of Unique Macro/Micro Laser Machined Feature for Mechanical Face Seals with Low Leakage, Low Friction, and Low Wear More particularly as to the invention, numerous studies have been conducted to evaluate the effects of known micro dimple or micropore surface texturing on friction reduction in mechanical seals. FIG. 1B illustrates one micropore feature 68 which corresponds to the micropores of the Etsion patents identified above. The micropore feature 68 is shown in cross section as a concave depression or pocket recessed into a seal face 69. This micropore 68 has a circular shape when viewed face-wise.

Optimum ratios for the known micro dimple configuration 68, depth (h) to diameter (D) (FIG. 1B), range from 0.02 to 0.5, and area density ratio, ratio of dimple area to seal face area, range from 20 to 55%. Within this range it has been shown that friction can be reduced by as much as 50%. Known studies indicate that if the ratio of depth to dimple diameter is reduced below 0.02 a dramatic reduction in performance is seen. Also observed in one investigation is the possibility that micro dimples can become filled with debris. This may degrade performance over time.

Figure 2A:
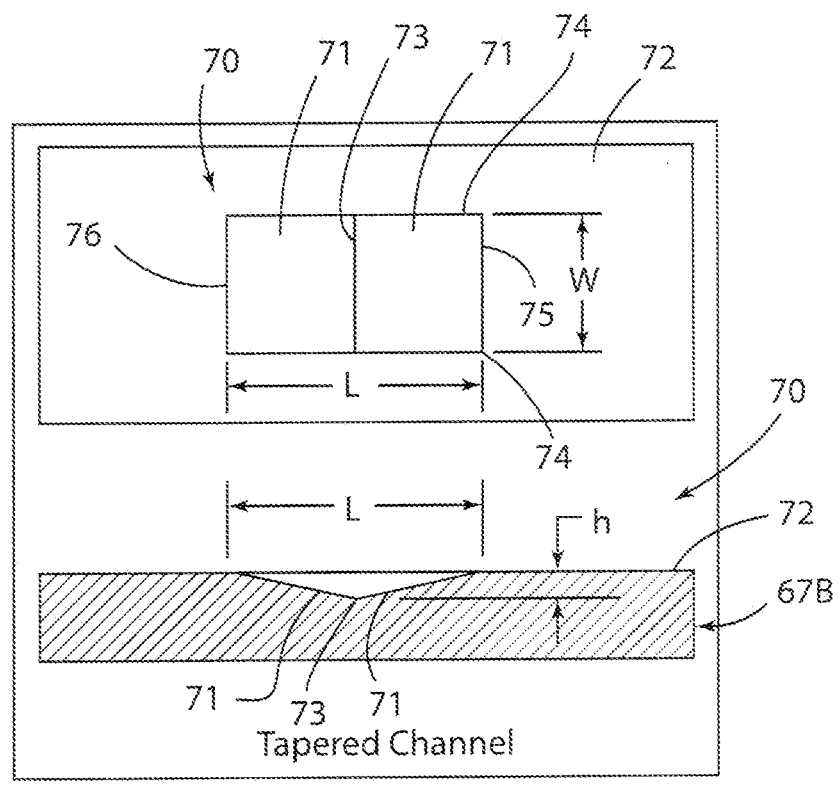
FIG. 2A is a radially-directed cross-sectional side view and a face-wise plan view of a tapered channel macro/micro feature of the invention.

The following discussion of the invention will show that with the use of a unique macro/micro feature, preferably having a tapered channel configuration 70 as seen in FIG. 2A, it is possible to achieve a reduction in friction of 65%, significantly lower face temperature, exhibit debris resistance, showing low to zero measureable leakage across the sealing region, and low to zero seal face wear when compared to an untextured seal face. The term macro/micro feature is used to describe a feature that has a depth to size ratio, h/L (FIG. 2A), which is an order of magnitude smaller than current micro dimple configurations, well below what may be considered useful from a performance standpoint. This new macro/micro feature, preferably formed as a tapered channel 70, demonstrates significant cavitation affects as well as hydrodynamic load support. These features are believed to be responsible for its low leakage as well as its low friction/wear characteristics.

With respect to FIG. 2A, the tapered channel 70 has a V-shaped cross-sectional shape as seen in side cross-section which is defined by a pair of intersecting inclined channel faces 71 which angle downwardly from the seal face 72 to define a channel apex 73. The tapered channel 70 has a rectangular shape in plan view as seen at the top of FIG. 2A, which rectangular shape is defined by side faces 74 and opposite end edges 75 and 76 which can be leading and trailing edges respectively, or vice versa, depending upon the rotation of the shaft 12. As seen in FIG. 2A, the tapered channel 70 is defined with a depth h, a length L, and a width W, the specifics of which are discussed in further detail hereinafter.

Figure 2B:
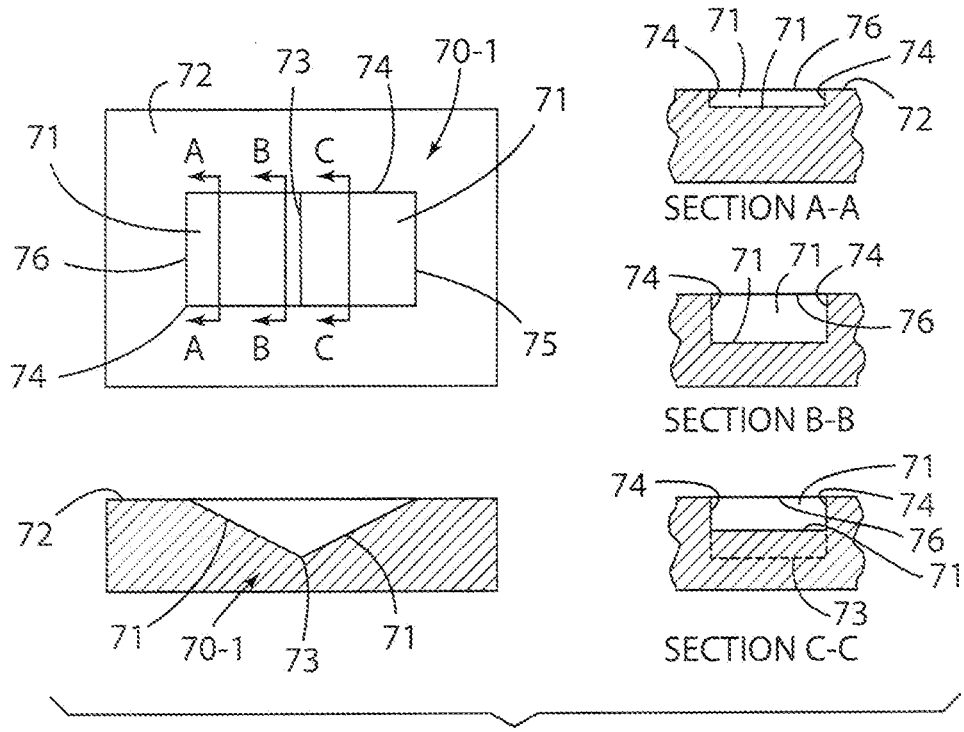
FIG. 2B illustrates a first variation of the tapered channel macro/micro feature of the invention by a radially-directed cross-sectional view, a face-wise plan view, and three circumferentially-directed cross-sectional views taken along section lines A-A, B-B and C-C.

Referring to FIG. 2B, an alternate tapered channel 70-1 is shown which is formed substantially the same as the tapered channel 70 of FIG. 2A, but the depth h is deeper which provides an increased angle for the channel faces 71. In this illustrated embodiment, the channel faces 71 converge to the single apex 73. This tapered channel 70-1 also has a rectangular configuration. As to the side faces 74, the side faces extend generally axially relative to the shaft axis, although this axial orientation may vary depending upon the positioning of the tapered channels 70 relative to the shaft. At the least, the side faces 74 have a somewhat rectangular orientation relative to the inclined channel faces 71. While the angle between the side faces 74 and the inclined faces 71 may have a right angle orientation as seen in the section views of section A-A, B-B and C-C, these side faces 74 also might be slightly angled relative to the inclined faces 71 depending upon design requirements or manufacturing processes, as can be seen in FIGS. 3B and 3C.

Figure 2C:
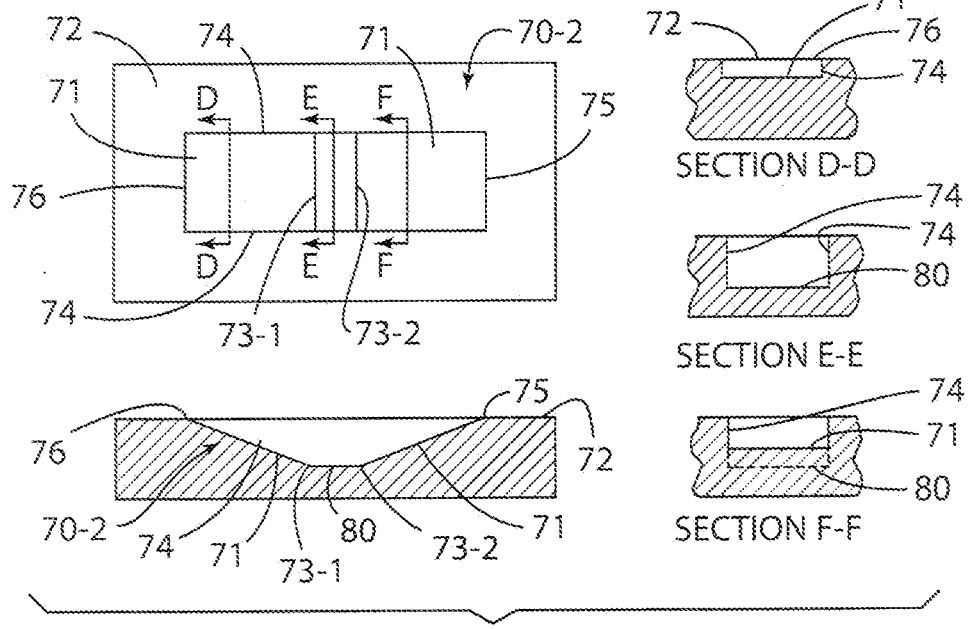
FIG. 2C illustrates a second variation of the tapered channel macro/micro feature of the invention by a radially-directed cross-sectional view, a face-wise plan view, and three circumferentially-directed cross-sectional views taken along section lines D-D, E-E and F-F.

As discussed further herein, the ratio of the depth h to length L can vary but preferably the length L is maintained close to 1.779 mm or a length closely proximate thereto. Preferably, this is the proximate length that would be set for the tapered channel 70 to define the V-shaped cross-section shown in FIG. 2B. Up to this length, the depth h can be varied to maintain the V-shape of FIGS. 2A and 2B. However, the length L of the tapered channel may also be lengthened as seen in the channel variation of FIG. 2C wherein the channel 70-2 has a length greater than 1.77 mm or so. To extend the length, it also may be desirable to define a flat bottom surface 80 which intersects with the channel side faces 71 by a pair of apexes 73-1 and 73-2. The channel 70-2 still includes the inclined faces 71, side faces 74 and terminates at the edges 75 and 76 as well as the two apexes 73-1 and 73-2. The channel 70-2 is provided with the additional bottom surface 80 which allows for extension of the length L while maintaining an adequate incline of the inclined faces 71 relative to the seal face 72.

Further discussion of these tapered channels is also provided in the following discussion.

With respect to FIG. 3A, the tapered channels 70A are shown in the seal face 72 and designated with reference numeral 70, although it will be understood that the tapered channel feature 70 also can have the configurations of 70-1 or 70-2 without departing from the scope of the invention. FIGS. 3A-3C are pictorial representations of the seal face 72 and the tapered channel features 70.

As to the pattern of the features 70, FIGS. 3A-3C illustrate the seal ring with radially inner and outer circumferential edges 80 and 81 with the seal face 72 extending radially therebetween to define the radial sealing region. The seal face edges 80 and 81 are defined by the inside and outside diameters of the annular seal ring 67B and preferably face radially inwardly and radially outwardly. The seal face 72 preferably faces axially towards an opposed seal ring 67A in the manner described above relative to FIG. 1A. Preferably, the tapered channel features 70 are provided in three rows 82, 83 and 84, which rows are circumferentially extending in annular rows that are radially spaced apart from each other across the seal face 72. FIG. 3A illustrates one representative pattern for these tapered channels 70. It will be understood that more or less rows may be provided. For example, if the width of the features 70 is made smaller or the seal face width is larger, more than three rows might be provided. With respect to the intermediate row 83, the channels 70 thereof are circumferentially staggered relative to the inner and outer rows 82 and 84 as seen in FIGS. 3A-3C. In this regard, the individual tapered channels 70 preferably are located radially between the channels 70 of the inner and outer rows 82 and 84, and are located circumferentially between or are circumferentially offset relative to the channel 70 of the inner and outer rows 82 and 84. This provides for a more uniform distribution of the tapered channels 70 both radially and circumferentially about the seal face 72.

DESIGN AND OPTIMIZATION RESULTS

In order to evaluate and optimize micro-feature performance, a laser simulation program was developed and used. The simulation software creates three output files; the first file defines the three dimensional geometry (such as the tapered channel shown in FIG. 3A), the second file defines the G-code that controls actual operation of a laser machining operation and the third file produced is a geometry file defining the periodic features on the sealing interface for analysis purposes. One laser machining operation is disclosed in U.S. Pat. No. 7,194,803 which can be adapted for formation of these tapered channels 70. The disclosure of the '803 patent is incorporated herein in its entirety by reference.

This file structure is defined specifically to work in conjunction with a proprietary finite element analysis/fluid mechanics software package. The software allows the user to enter in the appropriate loads, boundary conditions, fluid properties, material properties, seal geometry etc. . . . which is then solved by an iterative method to find the steady state solution of the seal under dynamic conditions.

This software package was used to optimize the tapered channel geometry. Optimization was performed preferably by first fixing the width (W) of the channel 70 at 0.889 mm, which corresponds to the width of the laser being used, and varying the length, L, to establish the different area densities evaluated (25%, 33%, and 45%) at the sealing interface. This was followed by an optimization study of feature depth while holding the area density constant (depths were varied from 0 to 7.5 µm in 1.5 µm increments). Analysis was conducted on water at a pressure of 1 MPa, a speed of 1500 rpm, and an inlet temperature of 32° C. using a 73 mm balance diameter seal. Examples of analysis results under these conditions are shown in FIG. 4.

Figure 4:
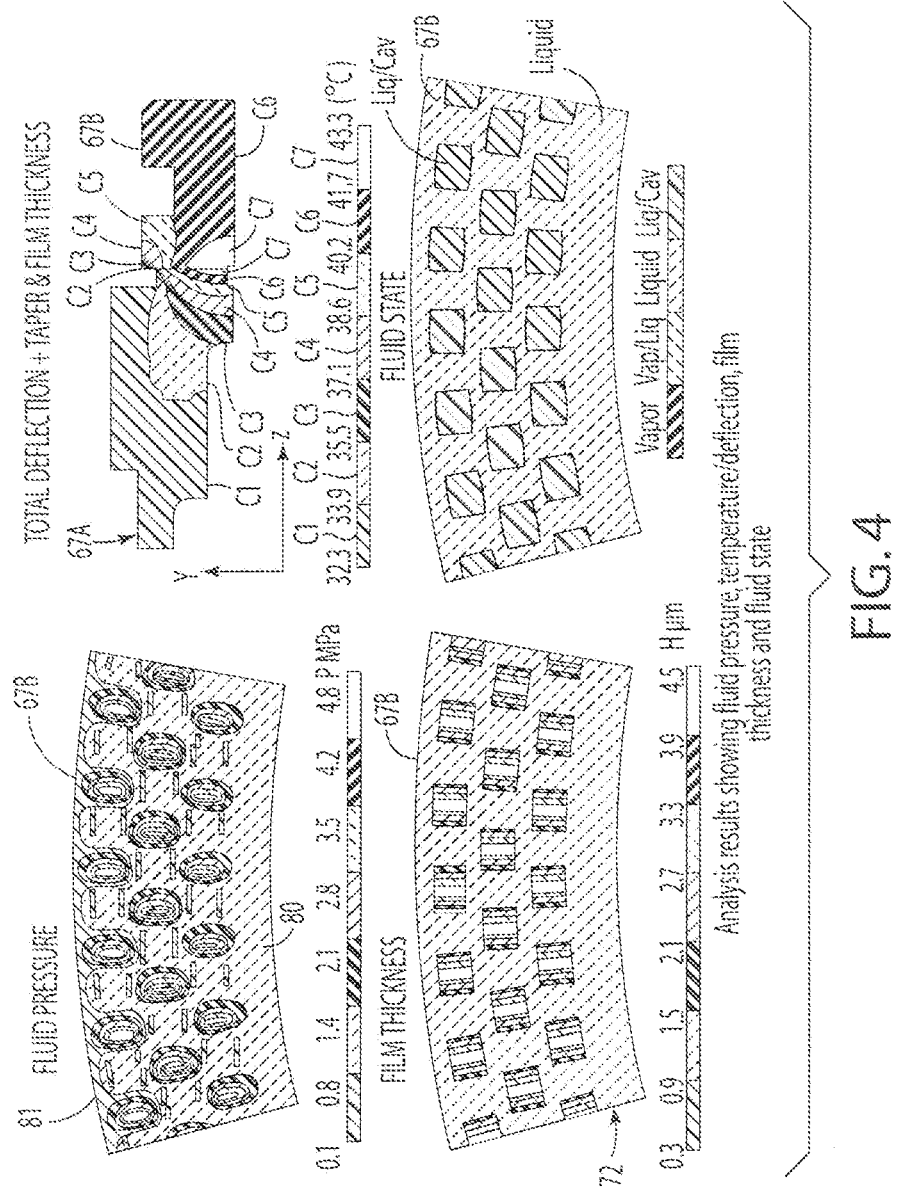
FIG. 4 is a comparison of the seal face illustrating the analysis results showing fluid pressure, temperature/deflection, film thickness and fluid state.

FIG. 4 shows the analysis results showing fluid pressure, temperature/deflection, film thickness and fluid state. With respect to the fluid pressure in the upper left corner of FIG. 4, the lighter areas each corresponds to one of the tapered channels 70 and represents the areas adjacent to the channels 70 having the greatest fluid pressure. Notably, this fluid pressure is found at the trailing edge 75 of the tapered channels 70 during shaft rotation and represents the fluid pressure buildup due to the hydrodynamic effects which affects or generates a hydrodynamic lift for the seal ring 67A and 67B or other equivalent seal rings. In the lower left corner of FIG. 4, the film thickness results are shown wherein the thinnest film thickness is found across the seal face 72 and at the leading and trailing edges 76 and 75 of the tapered channels 70 since it is this thin film thickness which is generated between the seal faces and generates the hydrodynamic lift. The greater film thickness progressively increases to 4.5 micrometers which is in the center of the channels 70 near the apex 73 which is a natural result since the fluid film would fill the depth of the individual tapered channels 70.

A total deflection and taper and film thickness is seen in the upper right corner, wherein the bar colors C1-C7 are shown and labeled in the cross-sections of the seal rings 67A and 67B. The fluid state in the tapered channels 70 is shown in the lower right corner. Most significantly as to the fluid state, the fluid found between the seal faces has a thin film of liquid and maintains this liquid form without forming vapor or a combination of vapor and liquid. Within the tapered channels 70, a combination of liquid and cavitation occurs as represented by the darker color indicated in FIG. 4. The effect of this combination of liquid and fluid cavitation is found within the tapered channels 70 as discussed further hereinafter.

Figure 5:
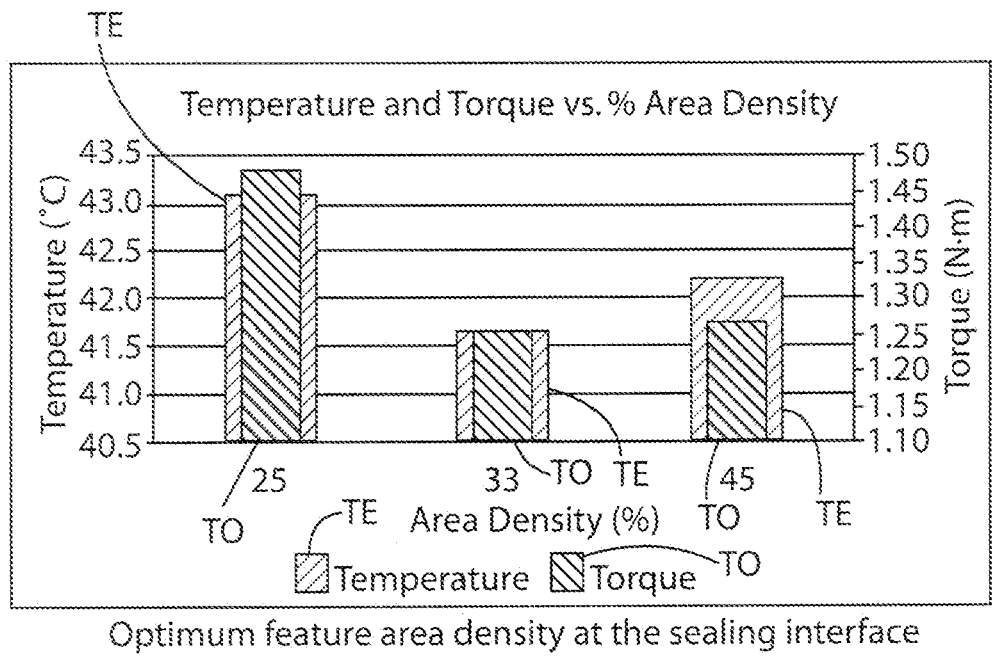
FIG. 5 is a graph showing optimum feature area density at the sealing interface.
Figure 6:
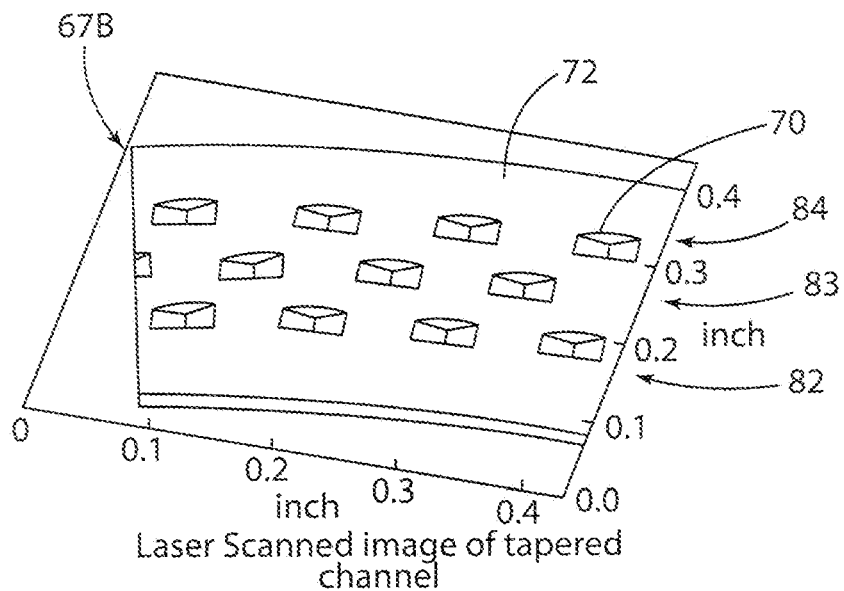
FIG. 6 is a laser scanned image of the tapered channels.
Figure 7:
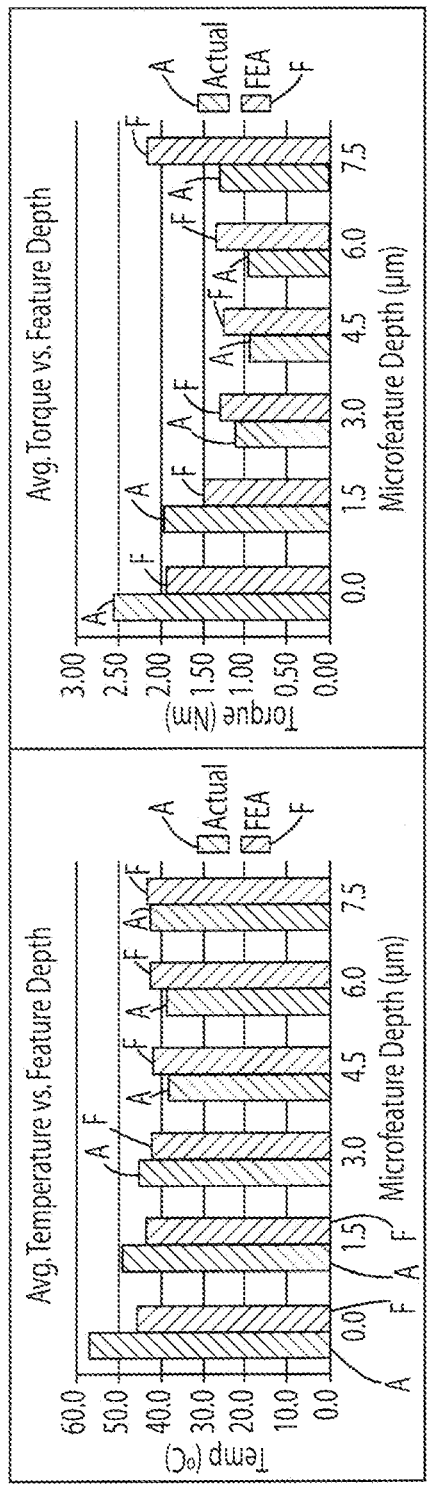
FIG. 7 is a graph showing a comparison of the FEA and actual test results of temperature and torque vs. depth.

Analysis showed an optimum area density at approximately 33% as shown in FIG. 5 by plotting of Temperature and Torque by overlapping bars indicated by TE and TO. Analysis also predicted an optimum feature depth h of 4.5 µm. For this case the h/L ratio was 0.00253, an order of magnitude smaller than previous micro dimple structures. FIG. 6 shows an actual laser scanned image of seal ring 67B used for testing with optimum density and depth features. Optimized values were verified by experiment by holding density constant and varying depth. Test results (acquired real-time using automated data acquisition) were compared to analysis and are shown in FIG. 7 which compares Actual A with FEA F.

Test results show good correlation for trend when compared to analysis. This ability to predict sealing performance allows for the optimization of macro/micro feature design, making this a very valuable tool for initial design iterations.

Figure 8:
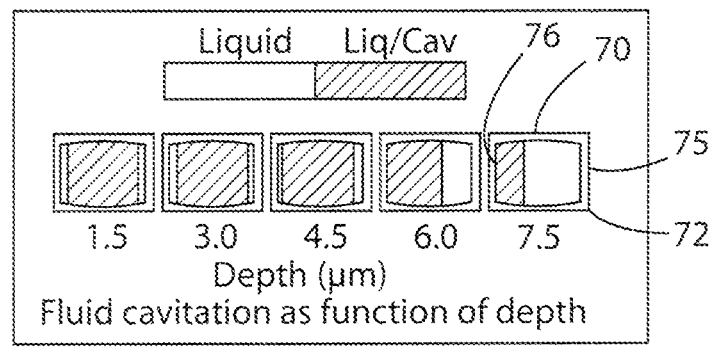
FIG. 8 shows fluid cavitation as a function of depth.
Figure 10:
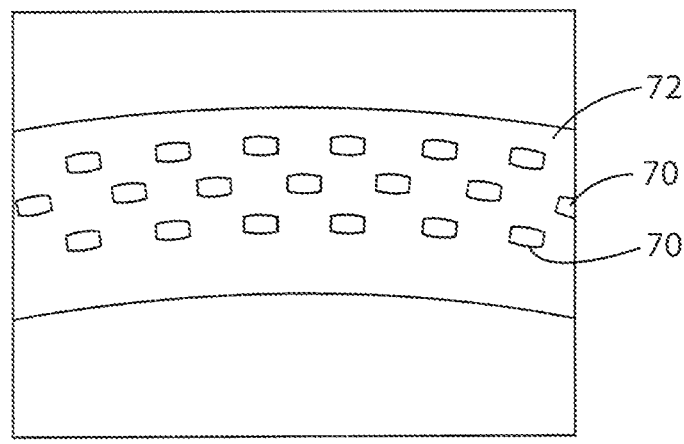
FIG. 10 is a post test image of a tapered channel seal face.

Analysis prediction also provided insight into the behavior of the features themselves. Results suggest that the optimum feature is one which maintains a state of full cavitation across the feature 70 and also provides significant hydrodynamic load support (see FIG. 4) so that contact is minimized. FIG. 8 illustrates the effect of feature depth h on cavitation. In addition to the advantages associated with reduced friction and wear, the analysis predicts no measurable leakage for either the textured or un-textured seals. Low leakage for the textured seal may be attributed primarily to the large regions of cavitation that affectively occupies flow space within the features 70.

TEST RESULTS

Testing was conducted using the optimized tapered channel (4.5 micron depth, 33% area density) and compared to a standard untextured mechanical seal in two different test configurations: dynamic friction testing in water and light hydrocarbon testing in high pressure liquid ethane. Seal spring load, balance, materials, and operating conditions were kept constant so a direct comparison could be made.

Friction Testing

A unique tester was built that is able to directly measure seal generated torque on a single seal with a resolution of 0.02 N-m. Each test utilized a mechanical seal with a 73 mm balance diameter that was run for 24 hours on water at steady-state operating conditions of 1500 rpm, 32° C., and 1.03 MPa. A series of 5 untextured face tests were run to establish a baseline for comparison for face temperature, dynamic friction, and leakage.

Figure 9:
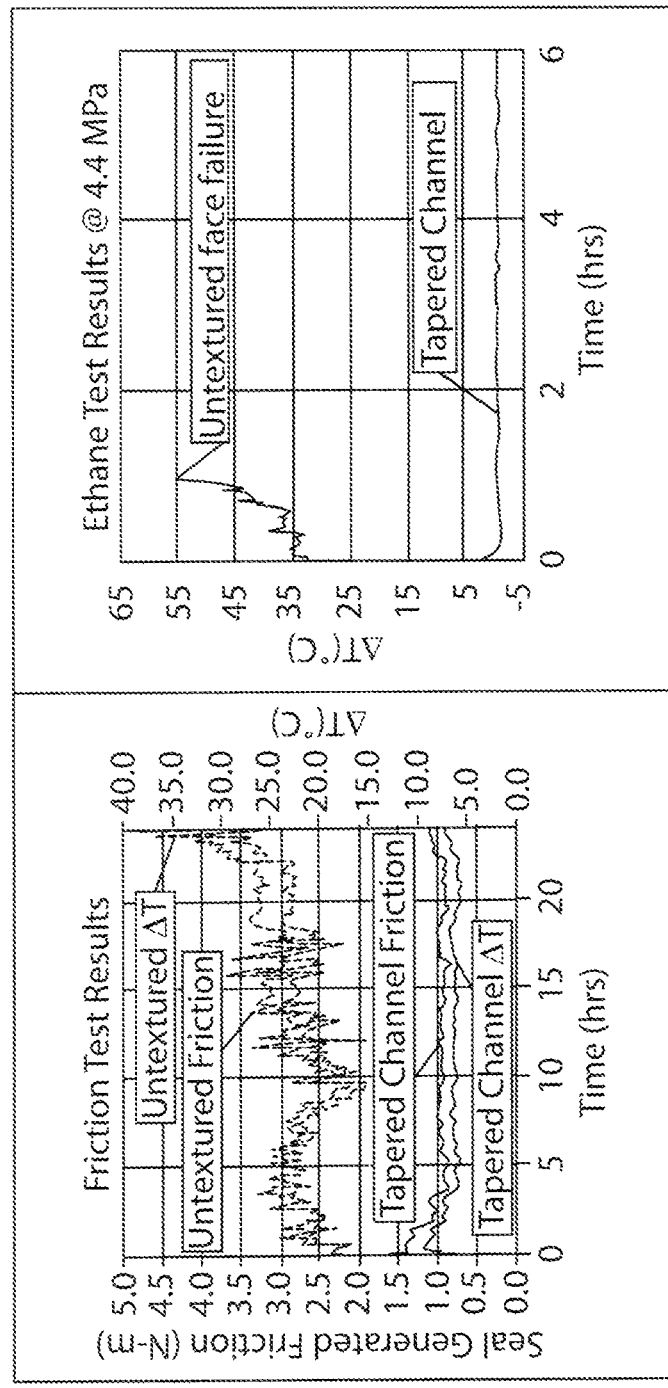
FIG. 9 is a graph of friction testing (left), ethane test (right) temperature and friction plots for tapered channel and untextured mechanical seal designs.
Figure 11:
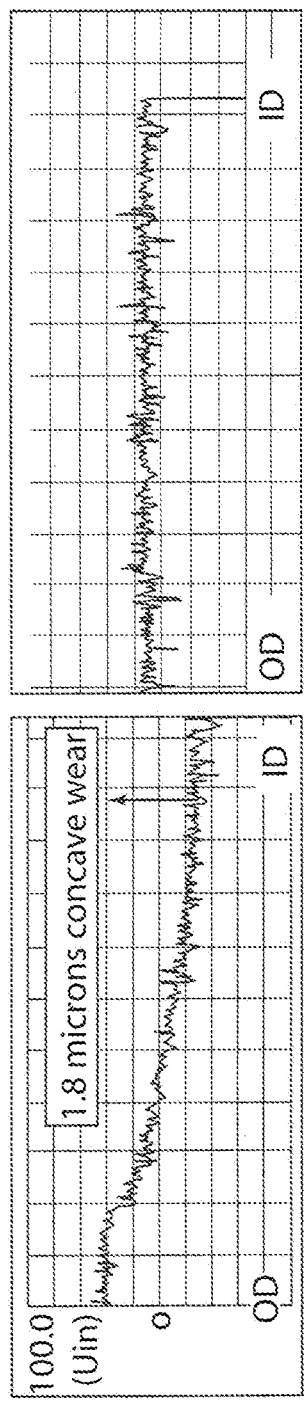
FIG. 11 is graph showing a friction post-test radial trace of a carbon face run against an untextured silicon carbide face (left) and a carbon face run against a silicon carbide face incorporating the tapered channels (right).

For performance comparison as shown in FIG. 9, the difference in temperature between the stationary face and the test fluid, ΔT, was used. Results as shown in FIG. 9 show a significant reduction in tapered channel face temperature. The average untextured ΔT was 20.7±3.9° C. compared to the tapered channel average ΔT of 6.4±0.7° C. This is a 69% reduction in face temperature. Beyond this, the tapered channel topography also offered increased seal stability as the temperature fluctuation throughout the length of the test was minimal (FIG. 9). The dynamic friction tracked the face temperatures in each test configuration with the untextured seal averaging 2.8±0.45 N-m compared to the tapered channel design of 0.98±0.14 N-m. This resulted in a friction reduction of 65% when using the tapered channel design. No leakage was observed in either the untextured or tapered channel topography tests. Post-test inspection of the untextured seal showed 1.8 microns of concave wear (from an OD to ID trace), indicating thermal distortion due to ID contact. Inspection of the tapered channel faces showed no measurable wear of either the micro-featured face 72 (FIG. 10) or the mating carbon. FIG. 11 shows a comparison of radial taper traces for the untextured and tapered channel carbon mating faces across one side. Both faces were lapped flat to within one helium lightband prior to testing.

Ethane Testing

Referring to FIG. 9, a 114.3 mm balance diameter mechanical seal was tested on pure ethane at steady state operating conditions of 3600 rpm and 15° C. with pressure ranging from 3.8-8.3 MPa. A tapered channel design (33% density and h/L=0.00208) was run for a total of 94 hours with consistent results while the comparable untextured seal failed in less than one hour at a pressure of 4.4 MPa due to excessive face temperature. FIG. 9 shows the temperature difference (ΔT) between the seal face and test fluid for the untextured and tapered channel topography design at a pressure of 4.4 MPa. The untextured face design failed when the ΔT reached 55° C. The average ΔT for the tapered channel design was −0.5±0.5° C. This slightly negative ΔT can be attributed to the cooling effect of ethane as it changes phase across the seal face. Seal leakage was measured using both a mass flow sensor and rotometer and was less than 0.6 L/hr, the minimum resolution of the measuring devices, throughout the tested pressure range. Post-test inspection of the untextured seal faces showed aggressive wear due to hard contact. Inspection of the tapered channel seal faces showed no measurable wear after 94 hours of dynamic operation at pressures ranging from 3.8-8.3 MPa.

CONCLUSIONS

A unique tapered channel macro/micro feature 70 has been developed that shows significant improvement in seal performance when compared to an untextured face. Experiments in water correlate well for trend when compared to analysis and testing in ethane shows the wide range of operating conditions for which this new feature can provide enhanced performance. Low contact and hence low wear are attributed to a more distributed hydrodynamic load support function. Likewise, low leakage is believed to be the result of optimized cavitation function. No debris was discovered in the microfeatures at the conclusion of any testing.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A mechanical face seal comprising:
   a pair of relatively rotatable seal rings having axially opposing seal faces which define a sealing region therebetween, said seal rings being annular so as to extend circumferentially about a rotation axis, and said sealing region extending radially between inside and outside diameters of said seal rings to seal a fluid in a sealing chamber near one of said diameters thereof, said fluid being a liquid; and
   at least one of said seal faces including respective hydrodynamic macro/micro features which generate a fluid film of liquid that generates hydrodynamic lift during relative rotation of one of said seal rings relative to the other, said macro/micro features being formed as tapered channels which are spaced radially from both of said inside and outside diameters and have an axial depth defined by a central depth portion at a center of said tapered channels and have circumferentially spaced, tapered ends which extend circumferentially from said central depth portion and terminate at respective end edges to define a circumferential length, said central depth portion opening circumferentially into both of said tapered ends to allow said fluid to flow circumferentially from one of said tapered ends to the other of said tapered ends, and said tapered ends having flat, inclined channel faces which angle downwardly from said end edges at a constant slope relative to said seal face so that said tapered channels progressively decrease in depth from said axial depth at said central depth portion to each of said end edges at said seal face so that a film thickness of said fluid film progressively increases in conformance with said constant slope to a greatest film thickness at the center of said tapered channel and said fluid film fills the depth of said tapered channel in said central depth portion to generate said hydrodynamic lift during relative rotation of said seal rings.

2. The mechanical face seal according to claim 1, wherein said tapered channels are each defined by radially spaced, side edges which extend circumferentially along said central depth portion and said tapered ends, said side edges extending axially at an upright angle relative to a bottom surface of said central depth portion.

3. The mechanical face seal according to claim 1, wherein said tapered channels are distributed over said respective seal face in a plurality of circumferentially extending, annular rows.

4. The mechanical face seal according to claim 3, wherein said rows of the tapered channels are concentric and radially spaced apart from one another.

5. The mechanical face seal according to claim 4, wherein the tapered channels of each said row are radially staggered from one said annular row to the next to provide a greater distribution of said tapered channels over said seal face.

6. The mechanical face seal according to claim 1, wherein said tapered channels are each defined by radially spaced, side edges which extend circumferentially along said central depth portion and said tapered ends and define a radial width of said tapered channels, said tapered ends having said end edges which define said circumferential length of said tapered channels which is greater than said radial width.

7. The mechanical face seal according to claim 6, wherein said axial depth is substantially smaller than said circumferential length wherein a ratio of said axial depth to said circumferential length is between 0.00084 and 0.00422.

8. The mechanical face seal according to claim 1, wherein said tapered channels have a V-shaped cross-section when viewed radially which is defined by said inclined channel faces having said constant slope that intersect at a channel apex.

9. The mechanical face seal according to claim 1, wherein said tapered ends of said tapered channels converge axially into said seal face and each terminate at a respective apex defined at said central depth portion with a flat bottom surface being defined between said respective apex of one of said tapered ends on one side thereof and said respective apex of another of said tapered ends on another side thereof.

10. The mechanical seal face seal according to claim 7, wherein said ratio of said axial depth to said circumferential length generates said fluid film wherein said fluid film within said grooves is in a state of cavitation along a portion of said circumferential length extending between said tapered ends through said central depth portion.

11. The mechanical seal face seal according to claim 1, wherein said axial depth is substantially smaller than said circumferential length such that said fluid film within said grooves is in a state of full cavitation along said circumferential length.

12. A mechanical face seal comprising:
a pair of relatively rotatable seal rings having axially opposing seal faces which define a sealing region therebetween, said seal rings being annular so as to extend circumferentially about a rotation axis, and said sealing region extending radially between inside and outside diameters of said seal rings to seal a fluid in a sealing chamber near one of said diameters thereof, said fluid being a liquid; and
at least one of said seal faces including respective hydrodynamic macro/micro features which generate hydrodynamic lift during relative rotation of one of said seal rings relative to the other, at least one of said seal faces having said macro/micro features defined by a plurality of tapered channels which are distributed over the seal face in a plurality of circumferentially extending, annular rows that are concentric and spaced radially from both of said inside and outside diameters, said tapered channels serving as hydrodynamic lift features that generate a fluid film of said liquid that generates a hydrodynamic lift which provides axial separation of the seal faces that permits formation of said fluid film between the seal faces, said rows of the tapered channels being concentric and radially spaced apart from one another, each of said tapered channels having flat, inclined channel faces defined by a constant slope relative to said seal face and an axial depth defined by a central depth portion at a center of said tapered channels and having circumferentially spaced, tapered ends which are defined by said inclined channel faces so as to extend circumferentially from said central depth portion and terminate at respective end edges, said central depth portion opening circumferentially into both of said tapered ends so as to permit a flow of said fluid film circumferentially from one of said tapered ends into the other of said tapered ends and said fluid film has a greatest thickness at the center of said tapered channel, and said tapered ends progressively decreasing in depth as defined by said inclined channel faces with said constant slope, wherein said depth decreases from said central depth portion to said seal face, said tapered ends having said end edges defining a circumferential length greater than said axial depth wherein a ratio of said axial depth to said circumferential length is between 0.00084 and 0.00422.

13. The mechanical seal according to claim 12, wherein said tapered channels of each row are radially staggered from one annular row to the next to provide a greater distribution of the tapered channels over the seal face.

14. The mechanical face seal according to claim 12, wherein said axial depth is substantially smaller than said circumferential length such that said liquid of said fluid film within said grooves is in a state of cavitation along said circumferential length.

15. The mechanical face seal according to claim 12, wherein said tapered ends of said tapered channels extend axially into said seal face and terminate at a respective apex defined at said central depth portion, said central depth portion being defined by an axial-facing bottom surface terminating circumferentially at one said apex at each opposite end.

16. A mechanical face seal comprising:
a pair of relatively rotatable seal rings having axially opposing seal faces which define a sealing region therebetween, said seal rings being annular so as to extend circumferentially about a rotation axis, and said sealing region extending radially between inside and outside diameters of said seal rings to seal a fluid in a sealing chamber near one of said diameters thereof, said fluid being a liquid; and
at least one of said seal faces including respective hydrodynamic macro/micro features which generate a fluid film of liquid which generates hydrodynamic lift during relative rotation of one of said seal rings relative to the other, said macro/micro features being formed as tapered channels which are spaced radially from both of said inside and outside diameters and each have an axial depth defined by a central depth portion and have circumferentially spaced, tapered ends which are flat and extend circumferentially from said central depth portion and terminate at respective end edges which define a circumferential length of each said tapered channel, said central depth portion opening circumferentially into both of said tapered ends so that fluid flows circumferentially from one of said tapered ends to the other of said tapered ends with said fluid film having a greatest film thickness at said central depth portion, and said tapered ends progressively decreasing in depth through a constant slope from said central depth portion to said seal face to generate said hydrodynamic lift during relative rotation of said seal rings, said tapered ends of said tapered channels converging axially into said seal face and each terminating at a respective apex defined at said central depth portion, said tapered channels each being defined by radially spaced, side faces which extend circumferentially along said central depth portion and said tapered ends, wherein said side edges extend axially at an upright angle relative to a bottom of said central depth portion, said axial depth is substantially smaller than said circumferential length such that a ratio of said axial depth to said circumferential length is between 0.00084 and 0.00422 so that said fluid film of liquid within said grooves is in a state of cavitation along a portion of said circumferential length extending along at least one of said tapered ends and beyond said central depth portion to the other of said tapered ends.

17. The mechanical face seal according to claim 16, wherein said tapered ends of said tapered channels converge axially into said seal face and each terminate at the same point such that said apex at which each said tapered end terminates is the same apex to define a V-shaped cross section when viewed radially.

18. The mechanical face seal according to claim 16, wherein said central depth portion is defined by an axial-facing, flat bottom surface terminating circumferentially at opposite ends, wherein each end is the apex at which the respective tapered end of the tapered channels terminates.

19. The mechanical face seal according to claim 16, wherein said tapered channels are distributed over said respective seal face in a plurality of circumferentially extending, annular rows.

20. The mechanical face seal according to claim 19, wherein said rows of the tapered channels are concentric and radially spaced apart from one another.

\* \* \* \* \*